US010873117B2

(12) United States Patent
Hammond et al.

(10) Patent No.: US 10,873,117 B2
(45) Date of Patent: Dec. 22, 2020

(54) MULTI-LAYER STRUCTURES PREPARED BY LAYER-BY-LAYER ASSEMBLY

(71) Applicant: Massachusetts Institute of Technology, Cambridge, MA (US)

(72) Inventors: Paula T. Hammond, Newton, MA (US); Sun Hwa Lee, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 434 days.

(21) Appl. No.: 14/143,803

(22) Filed: Dec. 30, 2013

(65) Prior Publication Data

US 2014/0186724 A1 Jul. 3, 2014

Related U.S. Application Data

(60) Provisional application No. 61/748,089, filed on Jan. 1, 2013.

(51) Int. Cl.
*H01M 12/08* (2006.01)
*H01M 2/16* (2006.01)
*H01M 4/134* (2010.01)
*H01M 4/38* (2006.01)
*H01M 4/62* (2006.01)

(52) U.S. Cl.
CPC ......... *H01M 12/08* (2013.01); *H01M 2/1646* (2013.01); *H01M 2/1653* (2013.01); *H01M 2/1673* (2013.01); *H01M 2/1686* (2013.01); *H01M 4/134* (2013.01); *H01M 4/382* (2013.01); *H01M 4/62* (2013.01); *H01M 4/628* (2013.01); *H01M 2300/0082* (2013.01); *H01M 2300/0094* (2013.01); *Y02E 60/10* (2013.01)

(58) Field of Classification Search
CPC ............ H01M 2/1646; H01M 2/1653; H01M 2/1686; H01M 2/1673; H01M 4/382; H01M 4/134; H01M 4/62; H01M 4/628; H01M 12/08; H01M 2300/0082; H01M 2300/0094

See application file for complete search history.

(56) References Cited

U.S. PATENT DOCUMENTS

| | | | |
|---|---|---|---|
| 9,136,561 B2* | 9/2015 | Tsai | H01M 10/052 |
| 2004/0149572 A1* | 8/2004 | Schlenoff | B01D 69/12 |
| | | | 204/296 |
| 2011/0033746 A1* | 2/2011 | Liu | H01M 4/366 |
| | | | 429/209 |
| 2011/0269010 A1* | 11/2011 | Sawaguchi | B82Y 30/00 |
| | | | 429/144 |
| 2013/0017432 A1* | 1/2013 | Roumi | H01M 2/1686 |
| | | | 429/145 |
| 2014/0124176 A1* | 5/2014 | Zhamu | H01L 23/373 |
| | | | 165/133 |

* cited by examiner

*Primary Examiner* — Brittany L Raymond
(74) *Attorney, Agent, or Firm* — Honigman LLP (57) ABSTRACT

A protective layer can be deposited on a surface of an porous polymer separator placing on a Li-metal electrode to protect against adverse electrochemical activity in a battery. The protective layer can be a multilayered structure including graphene oxide.

21 Claims, 9 Drawing Sheets

| | Short-circuit time ($t_{sc}$, h) | Thickness of LbL layers (nm) | Roughness of LbL layers (nm) |
|---|---|---|---|
| Pristine membrane | 11.0 | 0 | 0 |
| 6 TL LbL membrane with GO | 281.8 | 470 | 20 |
| 12 TL LbL membrane with GO | 74.1 | 1,589 | 19 |
| 24 TL LbL membrane with GO | 190.8 | 4,298 | 182 |
| 4 TL LBL membrane without GO | 147.0 | 478 | 32 |
| 6 TL LBL membrane without GO | 77.3 | 1,140 | 50 |

FIG. 11

MULTI-LAYER STRUCTURES PREPARED BY LAYER-BY-LAYER ASSEMBLY

CLAIM OF PRIORITY

This application claims the benefit of prior U.S. Provisional Application No. 61/748,089, filed on Jan. 1, 2013, which is incorporated by reference in its entirety.

TECHNICAL FIELD

The invention relates to multi-layered structures and methods of producing multi-layer structures.

BACKGROUND

Energy consumption and global climate change suggest looking for an alternative energy conversion/storage system. Lithium-air batteries have shown promising electrochemical performance. However, for practical applications, lithium-air batteries face some challenges, such as development of electrochemically stable electrolyte, optimized structure of air electrode, and suppression of dendritic growth on lithium anode.

SUMMARY

In general, A protective layer can be deposited on a surface of an porous polymer separator placing on a Li-metal electrode to protect against adverse electrochemical activity in a battery. The protective layer can be a multilayered structure including graphene oxide.

In one aspect, a method of preparing a multi-layer structure on a substrate includes forming a pair of bilayers on a surface of the substrate, the first bilayer including a first material and a second material wherein the first material and the second material are oppositely charged materials or materials otherwise having affinity for each other, the second bilayer including a third material and a fourth material wherein the third material and the fourth material are oppositely charged materials or materials otherwise having affinity for each other, and the pair of bilayers including ion-conductive polymer and a barrier layer.

In certain embodiments, preparing the multi-layer structure can include contacting the membrane with a first solution containing the first material, contacting the membrane with a second solution containing the second material, contacting the membrane with a third solution containing the third material, and contacting the membrane with a fourth solution containing the fourth material. The first material and the third material can be the same or different. The second material and the fourth material can be the same or different.

In certain embodiments, the substrate can include a membrane, such as, for example, polypropylene or can be glass. The substrate can be plasma treated.

In certain embodiments, the first solution, the second solution, the third solution, and the fourth solution can be adjusted for hydrogen bonding between materials in the bilayers.

In certain embodiments, each solution, independently and optionally, can include a lithium salt, such as lithium bis (oxalate)borate, polyethylene oxide, graphene oxide, or polyacrylic acid.

In certain embodiments, the first material can be polyethylene oxide, the second material can be graphene oxide, the third material can be polyethylene oxide, and the fourth material can be polyacrylic acid. The materials can form a pair of bilayers on a polypropylene membrane.

In another aspect, a multi-layer structure can include a tetralayer, wherein the tetralayer can include an ion-conductive polymer and a barrier layer.

In certain embodiments, the tetralayer can be on a substrate and can include graphene oxide, polyethylene oxide, or polyacrylic acid. The tetralayer can include a first polyethylene oxide layer, a graphene oxide layer adjacent to the first polyethylene oxide layer, a second polyethylene oxide layer adjacent to the graphene oxide layer and opposite the first polyethylene oxide layer, and a polyacrylic acid layer adjacent to the second polyethylene oxide layer. The surface of the tetralayer can be more hydrophilic than a surface of the substrate. The thickness of the structure can increase as the number of tetralayers increases. The thickness of the tetralayer can change the ionic conductivities of the structure. The electrolyte permeability in the layer can be repressed with increasing thickness of the tetralayer, for example, graphene oxide can lower the permeability.

In another aspect, a battery device can include an electrode protective structure, wherein the electrode protective structure can include graphene oxide.

In certain embodiments, the battery can be a lithium battery, such as a lithium-air battery. The electrode protective structure contacts a surface of an anode. The electrode protective structure can include an ion-conductive polymer, and, optionally, a barrier layer. The electrode protective structure can include a first polyethylene oxide layer, a graphene oxide layer adjacent to the first polyethylene oxide layer, a second polyethylene oxide layer adjacent to the graphene oxide layer and opposite the first polyethylene oxide layer, and a polyacrylic acid layer adjacent to the second polyethylene oxide layer. The electrode protective layers suppress dendritic growth on an electrode, such as a lithium anode.

Other aspects, embodiments, and features will be apparent from the following description, the drawings, and the claims.

BRIEF DESCRIPTION OF THE DRAWINGS

FIG. 6(a) shows the thickness change of LbL layers versus the number of tetralayers; FIG. 6(b) shows ionic conductivities of pristine membrane and LbL-assembled membrane with GO; FIG. 6(c) shows electrolyte permeabilities of whole LbL-assembled membranes (PP membrane+

LbL layers) with and without GO incorporation; and FIG. 6(d) shows the calculated intrinsic permeabilities of LbL layers without support membrane. Red dots/bars are for $(PEO/GO/PEO/PAA)_n$ and black dots/bars are for $(PEO/PAA)_{2n}$. n means the number of tetralayers.

DETAILED DESCRIPTION

Layer-by-layer (LbL) assembly is a method for fabricating thin films by sequential adsorption of two or more materials with complementary functional groups or materials otherwise having affinity for each other. Typically, positively and negatively charged materials are used. LbL assembly can also be accomplished by hydrogen bonding, covalent bonding, as well as other specific interactions. LbL technique can be used to deposit a variety of materials including polymers, metals, ceramics, nanomaterials, biological molecules, micelles, small molecules, and other materials that can become charged or having affinity when dissolved in a solvent.

LbL multilayer films can be prepared in many different ways including dip-coating, spray-coating, and spin-coating. In dip-coating, a substrate is immersed in a solution containing a first coating material. The substrate can remain in the solution for a while before being pulled up. Excess liquid on the surface of the substrate can be washed, drained, or evaporated. The substrate is then immersed in a solution containing a second coating material. A spray LbL method uses alternate spray, instead of alternate dipping, of solutions or suspensions. Spin coating is a procedure where an excess amount of a solution is placed on the substrate, which is then rotated at high speed to spread the fluid by centrifugal force. In addition to aqueous solutions, aqueous suspensions and non-aqueous solvents can also be used for LbL assembly.

LbL assembly offers several advantages over other thin film deposition methods. Without using instruments, LbL technique can prepare multilayer films by dipping a substrate sequentially into different solutions, which makes the technique simple. One important quality of LbL assembly is the high degree of control over thickness due to the linear growth of the film thickness with the number of bilayers. Another advantage of LbL assembly is that many different materials can be incorporated in individual multilayer films.

LbL can be used to deposit oppositely charged materials, such as a polyanion and a polycation. A polyanion has a plurality of negatively charged functional groups, such as sulfonated polystyrene (SPS) or poly(acrylic acid), or a salt thereof. Graphene oxide (GO) is hydrophilic and often contains carboxyl groups and other functional groups. When dispersed in aqueous solution, GO becomes negatively charged in a solvent such as water. A polycationic polymer can be a polyamino acid, polyethylimine, polyallylamine, polylysine, polyornithine, polyethyleneimine, or mixtures or copolymers thereof.

LbL can also be used to deposit materials otherwise having affinity for each other. For example, in addition to relying on the electrostatic attraction between molecules of opposite charges, hydrogen-bonding interactions can also be used to produce multilayers. For instance, poly(carboxylic acid) and polymers containing electron-donating functional groups can be assembled into multilayers. Poly(carboxylic acid) can include poly(acrylic acid) (PAA) or poly-(methacrylic acid) (PMAA). Materials containing electron-donating functional groups include poly(ethylene oxide) (PEO), poly(vinyl alcohol), and poly(vinylpyrrolidone). In addition, that neutral polymer PEO and anionic GO can form an LbL multilayer films also suggests nonelectrostatic interactions can drive layer by layer assembly.

A bilayer LbL films can be formed by depositing alternating layers of oppositely charged materials or materials otherwise having affinity for each other. Optionally, a wash step can be used in between depositing steps to remove excess material and improve layer quality. A multilayer film can be formed by repeating this process. For example, a tetralayer film can be made by depositing a total of four alternating layers, i.e., two layers of bilayers. A single tetralayer can form a protective layer on an electrode surface. Alternatively, 2, 3, 4, 5, 6, 7, 8, 9, 10, 11, 12, 13, 14, 15 or more tetralayers can be used.

Figure 1:
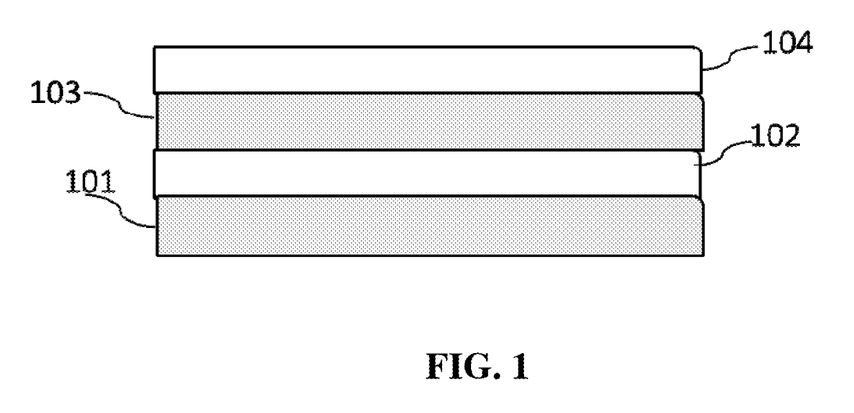
FIG. 1 is a schematic drawing depicting a multilayer structure.

FIG. 1 is a schematic drawing depicting a multilayer structure, a polymer tetralayer structure according to one embodiment. As shown in FIG. 1, 101 is a layer containing a first material, 102 is a layer containing a second material, 103 is a layer containing a third material, and 104 is a layer containing a fourth material. A first material in 101 and a third material in 103 can be the same or different; a second material in 102 and a fourth material in 104 can be the same or different. Adjacent layers can contain oppositely charged materials. For example, 101 and 103 can be anionic layers, and 102 and 104 can be cationic layers; alternatively, 101 and 103 can be cationic layers, and 102 and 104 can be anionic layers. Otherwise, adjacent layers in FIG. 1 represent materials having affinity for each other, such as hydrogen-bonding interactions.

The multilayer structure can be formed on a membrane, a substrate, or a membrane attached to a substrate. LbL assembly can use a variety of substrates, including oxides (glass quartz, Si, TiO2, mica etc.), noble metals (Au, Pt, etc.), and synthetic polymers (polyethylene terephthalate (PET), poly(methyl methacrylate) (PMMA), polyetherimide, etc.). LbL assembly can also be performed on a polymer membrane attached on a substrate, such as a polypropylene membrane attached on a glass substrate. The multilayer structure can include ion-conductive polymer and any of the layers can be a barrier layer.

Using LbL technique, multilayer films comprising one or more tetralayers of PEO/GO/PEO/PAA can be prepared. PEO can be used as an ion conductive polymer. Other ion conductive polymers include polyethyleneimine, polyacrylonitrile, and polysaccharides. GO can serve as an electrical insulator; in addition, being hydrophilic, GO disperses readily in water. When a PEO/GO/PEO/PAA multilayer film is built up on an electrode, it can function as protective layers. For example, a PEO/GO/PEO/PAA multilayer film can hinder short-circuit caused by Lithium dendrite and improve charge-discharge cyclability of lithium-air batteries. A GO layer can be a barrier layer.

The thickness of GO sheet before dispersing in water can be about 1 nm. PEO with a degree of polymerization more than 2000 (Mw=100,000 Da), and PAA with a degree of polymerization more than 600 (Mw=50,000 Da) can be used. GO is an extremely thin material and limited to pile up thickly by hydrogen bonding. This consequently yields thinner build-up of LbL multilayers with GO than PEO/PAA pair without GO. In addition, the thickness of LbL assemblies grew linearly.

Figure 2:
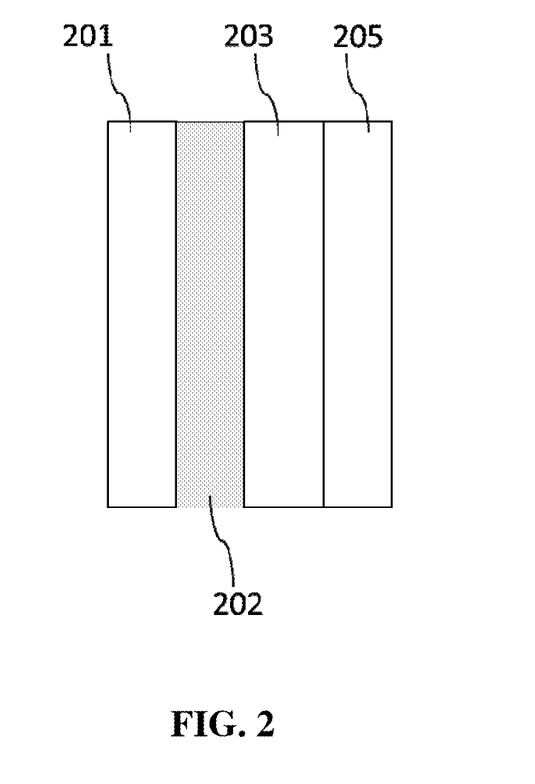
FIG. 2 is a schematic drawing depicting a battery.

FIG. 2 is a schematic view showing a battery according to one embodiment. As shown in FIG. 2, a battery can include a first electrode 201, a second electrode 205, and an electrolyte 203. The battery can also include a separator 204 (not shown) between a first electrode 201 and a second electrode 205. The first electrode 201 can contact a first current collector 206 (not shown), and the second electrode 205 can contact a second current collector 207 (not shown). A first electrode 201 is coated with a protective layer (or protective layers) 202. Alternatively, a second electrode 205 can be coated with a protective layer (not shown). The protective layer 202 can be a multilayer structure shown in FIG. 1, such as a PEO/GO/PEO/PAA multilayer film. A PEO layer in 202 can be next to electrode 201.

One electrode (either first electrode 201 or second electrode 205) can include a metal, an alloy, or a carbon-based material, e.g., porous carbon, graphite, a nanostructured conductive carbon, organic polymers, other carbon-based materials, carbon-supported metal oxides such as $TiO_2$, or combinations of these. A carbon-based electrode can optionally include binders, additives, or other materials.

The battery in FIG. 2 can be a metal/carbon battery, e.g., where one active material is a metal such as lithium, sodium, magnesium, calcium, or zinc. The battery in FIG. 2 can be a lithium battery, i.e., where one electrode (either first electrode 201 or second electrode 205) includes lithium metal or a lithium compound, such as a lithium metal oxide (e.g., a lithium cobalt oxide or a lithium manganese oxide). The term "battery" as used herein includes primary and secondary (rechargeable) batteries. Examples of lithium batteries include but are not limited to Li batteries (i.e., lithium metal batteries), Li-ion batteries, Li-ion polymer batteries, Li-air batteries, Li—$MnO_2$ batteries, Li—S batteries, Li—$SOCl_2$ batteries, Li—$SOCl_2$—BrCl batteries, Li—$SO_2Cl_2$ batteries, Li—$SO_2$ batteries, Li—$(CF)_x$ batteries, Li—$I_2$ batteries, Li—$Ag_2CrO_4$ batteries, Li-silver vanadium oxide (SVO) batteries; Li—CuO batteries, Li-copper oxyphosphate batteries, Li—CuS batteries, Li—PbCuS batteries, Li-iron batteries, Li-lead bismuthate batteries, Li—$Bi_2O_3$ batteries, Li-titanate batteries, Li—$V_2O_5$ batteries, Li—$CoO_2$ batteries, Li/Al—$MnO_2$ batteries, or Li/Al—$V_2O_5$ batteries. In particular, Li-ion, Li-ion polymer, and Li-air batteries can be useful as rechargeable batteries.

Currently, 34% of the world's total primary energy source comes from oil where prices are increasing due to declining fossil fuel reserves. It produces 40% of the total $CO_2$ emission, which is a major cause of global warming. Energy consumption and global climate change suggest looking for an alternative energy conversion/storage system. Electrification of road transportation and large-scale development of renewable energy are inevitable strategies to address these environmental issues. The major technical hurdle for this transformation is the insufficient storage capacity of the current energy storage system.

Rechargeable Lithium-ion batteries have been considered as a hope owing to their high energy density and efficiency. However, the highest energy storage that Li-ion battery can generate is too low to be satisfactory for key markets such as electrical vehicles. On the other hand, Lithium-air batteries can provide extremely high energy storage capability in comparison to other rechargeable batteries, and thus seem to be one promising alternative. Even though the estimated practical energy density of Li-air batteries is much lower (~1700 Wh/kg) than the theoretical value (12 kWh/kg), it is sufficient to drive electrical vehicles of more than 500 km per charge, which is comparable to gasoline vehicles.

Since the first Li-air battery reported in 1996, Li-air batteries have shown promising electrochemical performance for practical applications. One of the unique features of Li-air batteries is their open cell structure due to unusual active material, oxygen from ambient air, for cathode reaction. Oxygen is absorbed from the environment instead of being stored in the battery. Another notable feature of Li-air batteries is the use of lithium metal as an anode material that has the highest specific capacity (3862 mAh/g). On discharge, the lithium metal oxidized, releasing $Li^+$ ion into the electrolyte, and oxygen molecules which diffuse into the battery reduced by catalyst in the carbon-based air electrode to form Li—$O_2$ compound. The reaction mechanisms of Li-air batteries differ according to the electrolyte, non-aqueous or aqueous solvent, though all systems use Li metal and oxygen gas as an anode and cathode material. The theoretical voltage of Li—$O_2$ reaction in aqueous electrolyte is high ($E_0$=3.43 V for alkaline electrolyte and $E_0$=4.26 V for acidic electrolyte), but decomposition of aqueous electrolyte, safety issue between Li and electrolyte, and large volume of stacked cells due to the thick ceramic membrane prohibit the realization of aqueous type Li-air batteries. Therefore, the Li-air batteries using non-aqueous electrolyte are focused on. The non-aqueous Li-air batteries also face some challenges. These issues mainly include development of electrochemically stable electrolyte, highly efficient catalyst, optimized structure of air electrode, and suppression of dendritic growth on Li anode.

Li-anode protective layers can suppress Li dendritic growth on the anode surface of the Li-air batteries and enhance the cyclability of battery cells. High ionic conductivity and Li-ion transfer number, physical/chemical homogeneity at the contact surface with Li anode, controlled electrolyte permeability and longer dendrite short-circuit time are crucially required properties for Li-anode protective layer. Usually, polymer separators that directly contact on Li-anode are placed between anode and air electrode during the cell assembly to prevent short circuits of devices and absorb liquid electrolyte. For both anode-protection and separation between anode and cathode, a simple and universal way is developed to modify commercially available polymer membrane with ion-conductive polymer and graphene oxide (GO) via Layer-by-Layer (LbL) assembly. Polyethylene oxide (PEO), Li ion-conductive polymer, and polyacrylic acid (PAA) can be used to prepare LbL films. GO can be incorporated as an anionic material and barrier layer to prevent chemical fluctuation on the surface of Li-anode. Several cycles of (PEO/GO/PEO/PAA) tetralayer can be built up on the anode-facing side of membrane. LbL-modified membranes can show high ionic conductivity and Li transfer number, and low electrolyte permeability.

Short-circuit caused by Li dendrite can be hindered and charge-discharge cyclability of Li-air cells can be improved.

EXAMPLES

Figure 3:
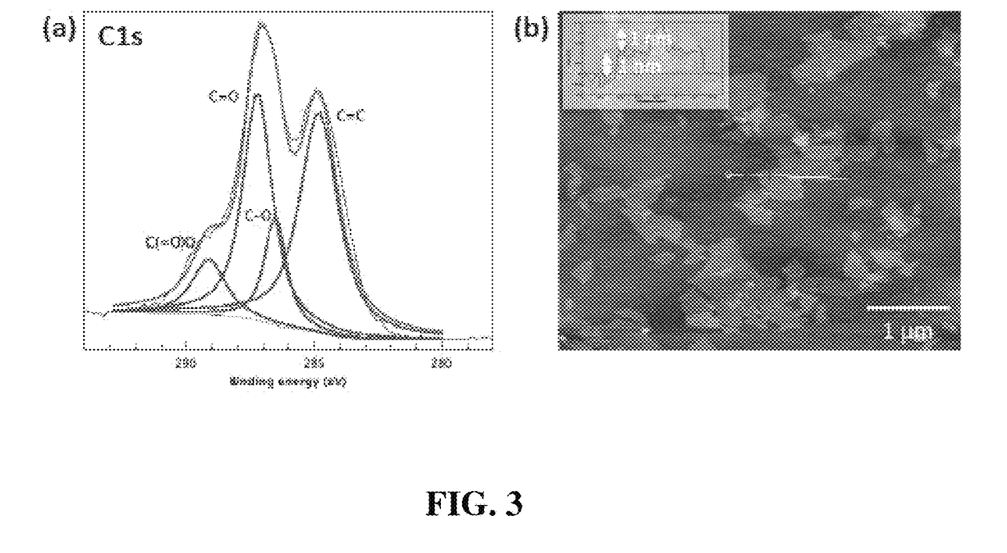
FIG. 3(a) is a C1s X-ray photoelectron spectroscopy (XPS) scan and FIG. 3(b) is an atomic force microscopy (AFM) image of graphene oxide (GO).

Materials and Instruments:

PEO (Mw=100,000 Da), 1,2-dimethoxyethane (DME) and hydrochloric acid (HCl) were obtained from Sigma-Aldrich, Inc. PAA (Mw=50,000 Da) was purchased from Polysciences, Inc. Lithium bis(oxalate)borate (LiBOB) and polypropylene ("PP") membrane (Celgard 2400) were provided by Chemetall and Celgard, LLC., respectively. Custom-made electrolyte (0.1 M $LiClO_4$ in DME) for electrochemical analysis was obtained from Novolyte technologies. Li foil was obtained from Alfa Aesar. Graphene oxide was synthesized by modified Hummer's method and used after dialysis at deionized water for 7 days. X-ray photoelectron spectroscopy (XPS) shows that abundant oxygen functional groups were induced on graphene sheets after oxidation (See FIG. 3). The average size of single sheet was 1.1 μm and thickness was ~1 nm.

Scanning electron microscopy (SEM) images were captured using JEOL 6700F at 5 keV and 30 A of Au—Pd was sputter-deposited on the samples prior to imaging to suppress charging. Cross-sectional image was taken from samples immersed in liquid nitrogen and cleaved. Surface morphology of the LbL films was obtained by atomic force microscopy (AFM) using Digital Instruments Multimode™ in tapping mode. Water contact angle on LbL-modified protective membrane was measured with Rame-hart. Profilometer (Veeco Dektak 150) was used to record the thickness of LbL layers five times at different locations. The thicknesses were averaged to yield one data point and the standard deviation of the measurements was taken as the error.

Layer-by-Layer Assembly on PP Membrane:

Layer-by-Layer (LbL) film was constructed using a programmable Carl Zeiss DS-50 slide stainer. PP membranes were attached on glass substrate by narrow double sided-tape on all edges of membrane and treated $O_2$-plasma for 30 seconds. The support membranes were first immersed in a PEO aqueous solution for 15 minutes ("min") and rinsed in rinsing solution for 2 min, followed by one 1 min rinse. Then, the substrate was exposed to GO aqueous solution (0.17 mg/ml) for 15 min and rinsed as before. PP membrane was dipped in PEO solution again as before, and then immersed in PAA aqueous solution, another anion solution, for 15 min, followed by the same rinse process with deionized water. 20 μM of polymers was dissolved in all polymer solutions and 10 mM of LiBOB was included for all polymer and polymer rinse solutions. For LbL assembly, pH of all solutions was adjusted to 2.5 for hydrogen bonding between materials. The tetralayer (TL) procedure was repeated desired times such as 4 TL, 6 TL, 12 TL and 24 TL.

Figure 4:
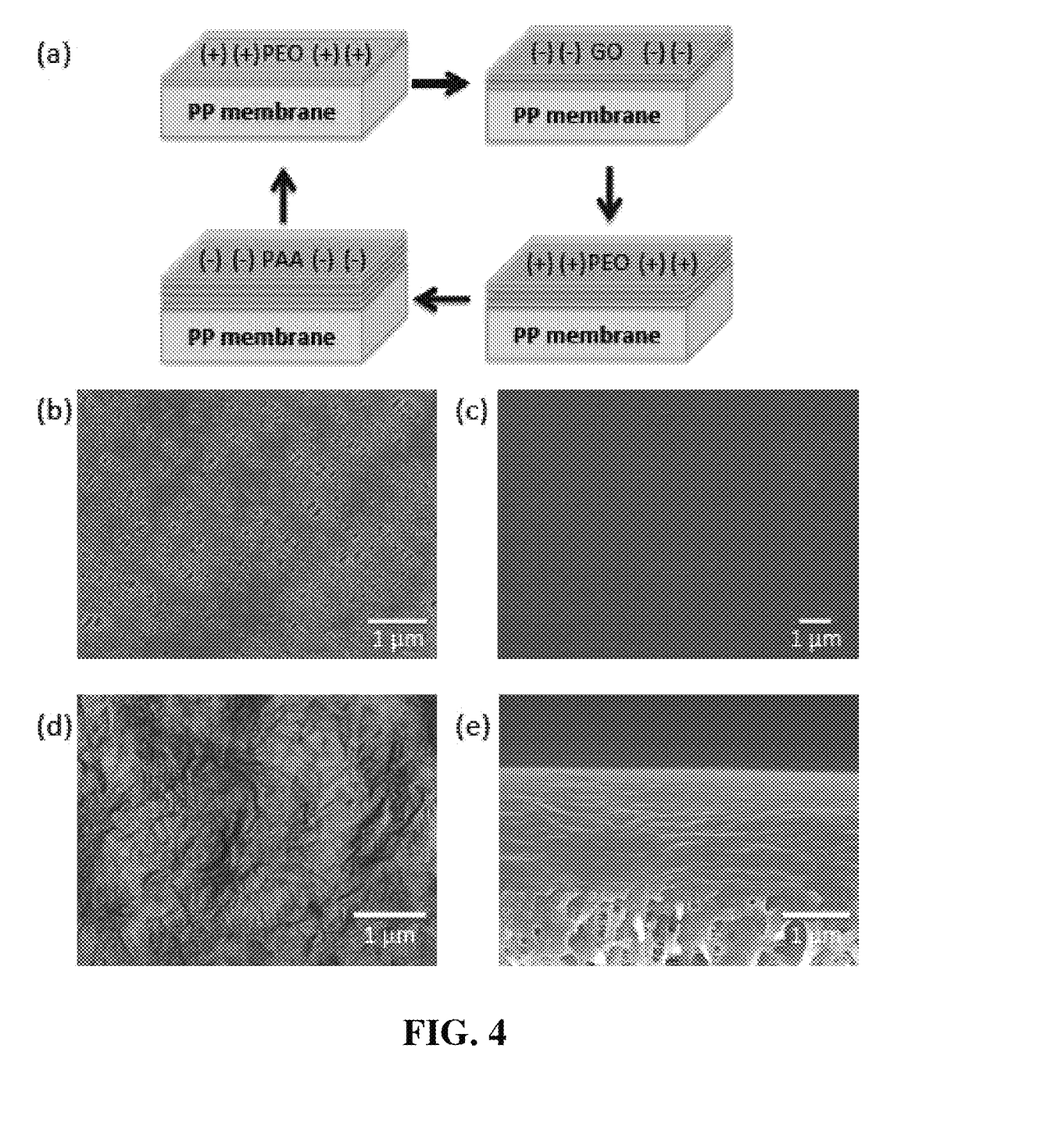
FIG. 4(a) is a schematic illustration of layer-by-layer (LbL) assembly on polypropylene (PP) membrane.
FIG. 4(b) is a scanning electron microscope (SEM) top-down image of pristine porous PP membrane.
FIG. 4(c) is an SEM top-down image of polymer top layer after LbL-assembly on pristine membrane.
FIG. 4(d) is an AFM image of graphene oxide top layer during LbL-assembly.
FIG. 4(e) is an SEM cross sectional image of 12 tetralayers of LbL-assembly on a porous membrane.

The procedure for PEO/GO/PEO/PAA LbL assembly on polymer membrane is described in FIG. 4(a). LbL assembly on PP membrane was achieved by immersing $O_2$ plasma-treated polypropylene membrane in PEO solution and two kinds of anionic solutions (GO and PAA), alternatively. GO was incorporated as a barrier layer for controlled delivery of electrolyte and suppression of Li dendrite. Before $O_2$ plasma-treatment, PP membrane was attached on a slide glass to deposit LbL layers on only one side of PP membrane. The pH for all solutions was adjusted to 2.5 to accomplish hydrogen bonding between materials and 10 mM of Lithium bis(oxalate)borate (LiBOB) was dissolved in all polymer solutions to increase ion conductivity and uniformity of LbL layers. PEO/GO/PEO/PAA tetralayers were repeatedly deposited as many times as desired.

Surface Properties of LbL Films:

FIG. 4(b) shows the scanning electron microscope (SEM) image of pristine membrane, which has irregular porous structure. After $O_2$ plasma-treatment, pore size of membrane was increased due to the degradation of PP by $O_2$ plasma, but it still preserve porous structure with sub-micron pores (See FIG. 5(a)).

After LbL assembly, it was observed that polymer layers and GO were uniformly assembled on pristine membrane as shown in FIGS. 4(c) and 4(d). Polymer layers smoothly covered the underlayers without any open pores or delamination. GO was deposited like papers due to its sheet structure. However, GO sheets were not easily discovered in cross-sectional view of SEM (FIG. 4(e)), because GO is extremely thin material that has 1 nm of thickness and limited to stack thickly by hydrogen bonding or charge-charge interaction.

Figure 5:
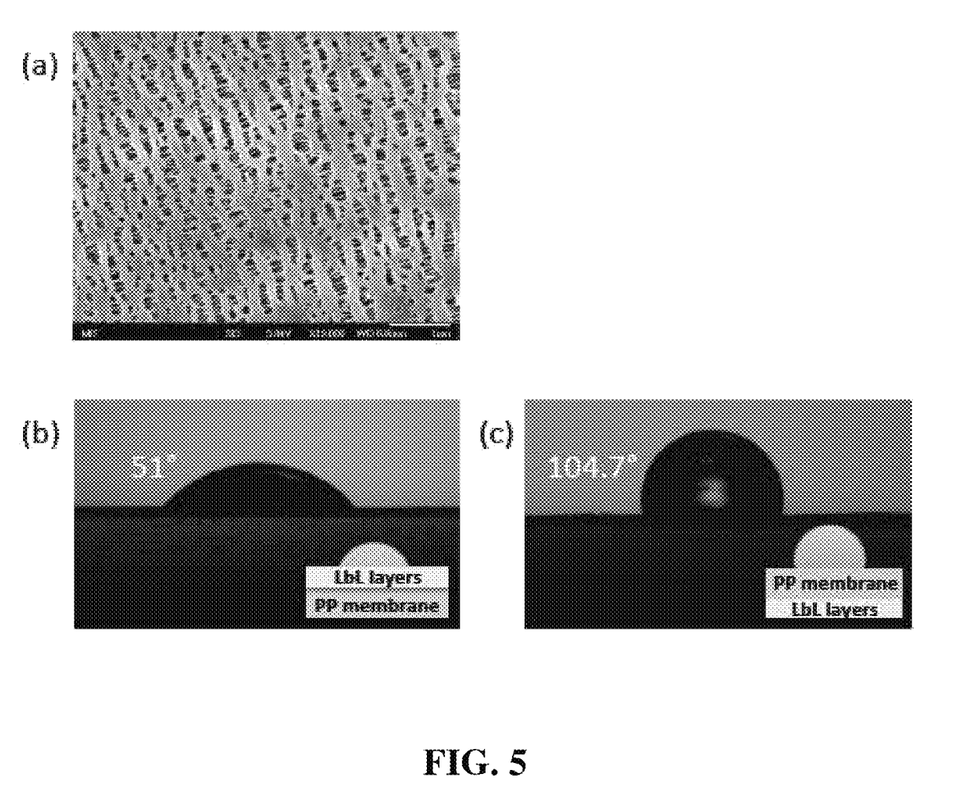
FIG. 5(a) is an SEM top-view image of polypropylene (PP) membrane after $L_2$ plasma treatment for 30 seconds.
FIG. 5(b) is water contact angle measurement of LbL-modified side.
FIG. 5(c) is water contact angle measurement of bare PP side of LbL-modified membrane.

Contact angle with water droplets was measured to investigate the influence of LbL assembly on surface properties of polymer membrane. FIGS. 5(b) and 5(c) show contact angle images of LbL modified face and bare PP face. Since LbL modification was conducted only one side of membrane, the membrane is janus-faced. LbL deposition decreased the contact angle to 51.0°, while pristine PP had 104.7° of water contact angle. This implies that the LbL-modified membrane is more hydrophilic compared to the bare PP membrane, so that more conformal interface between Li metal and membrane is accomplished. In addition, hydrophobic PP side can protect Li anode by repelling any atmospheric moisture during battery operation. Interestingly, electrolyte solvent (1,2-dimethoxyethane, DME) was well wetted on both sides to facilitate homogeneous distribution of Li ions over the entire contact area with Li metal.

Figure 6:
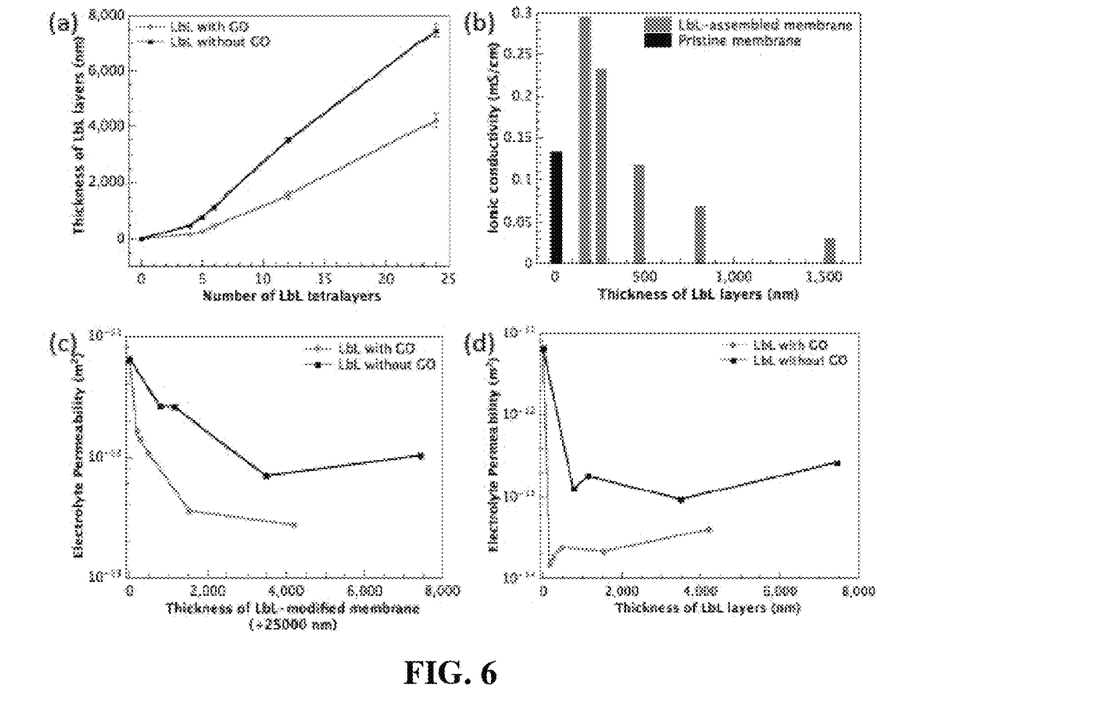

FIG. 6(a) shows the thickness of LbL layers as a function of the number of tetralayers. In this figure, two bilayers of PEO/PAA were counted as a tetralayer for LbL assembly without GO. LbL assembly including GO exhibited lower increase of thickness than LbL assembly without GO at the same number of tetralayers. As mentioned above, GO is an extremely thin material and limited to pile up thickly by hydrogen bonding. This consequently yields thinner build-up of LbL multilayers than PEO/PAA pair. In addition, the thickness of both LbL assemblies grew linearly from 4 tetralayers. Lower rate of thickness increase under 4 tetralayers seems attributable to the hydrophobic nature of PP membranes in spite of $O_2$ plasma treatment.

In practice, it is observed that LbL layers under 3 tetralayers didn't uniformly cover the whole membrane surface and had some open pores owing to unfavorable absorption of polyelectrolytes on hydrophobic PP surface. After complete coverage over 4 tetralayers, the LbL layers present linear thickness growth with increasing cycle. Note that examined LbL layers showed thicker thicknesses than those without dissolution of LiBOB in polymer solutions because changing of polymer chain conformation from stretched, rodlike molecules to three-dimensional random coils (See FIG. 7(a)).

Electrolyte Permeability:

Electrolyte permeability was determined by using modified wet-cup method. The membrane separated a dual-chamber apparatus, which contained electrolyte at one side and was exposed to air at the other side. The weight loss of electrolyte was monitored by precision balance at room temperature. The permeability of electrolyte was obtained from the volume change of electrolyte and thickness of membrane as $$p = \frac{\mu Q \Delta \chi}{A \Delta P}$$

where p is the permeability of a medium (m$^2$), μ is the dynamic viscosity of the fluid (Pa·s) (For DME, 4.70×10$^{-4}$ Pa·s), Q is the volume flow rate of the phase (m$^3$/s, density of DME is 0.867 g/m$^3$, and $\Delta\chi$ is the thickness of the bed of the porous medium (m). A corresponds to the cross sectional area (3.14×10$^{-4}$ m$^2$), and $\Delta P$ is the applied pressure difference (Pa).

$P_{LbL}$ was calculated from the following series resistance model for a bilayer membrane with LbL layer coating one side of the PP membrane:

$$\frac{1}{p_{total}} = \frac{X_{LbL}}{p_{LbL}} + \frac{X_{PPmembrane}}{p_{PPmembrane}} \quad (1)$$

where $X_i$ corresponds to the thickness fraction of component i and $P_i$ is permeability of component i. The permeability of the LbL layer, $P_{LbL}$, can be calculated from the measured permeability of the total membrane and PP substrate and the thickness fraction of all components.

Electrolyte permeabilities were repressed with increase of LbL thickness (See FIG. 6(c)). It is obvious that GO layers in LbL assembly effectively control the permeability than mere polymer multilayers. 4.20 μm-thick LBL-modified membrane with GO showed 2.70×10$^{-13}$ m$^2$ of permeability, while 7.43 μm-thick LbL-modified membrane without GO had 1.03×10$^{-12}$ m$^2$ of permeability. Interestingly, the permeability of the modified membrane with only 170 nm-thick LbL layers (1.64×10$^{-12}$ m$^2$) was 4 times lower than pristine membrane (6.48×10$^{-12}$ m$^2$).

Based on equation (1), intrinsic permeability of LbL layers can be calculated using series resistance model for LbL-modified membranes with or without GO. As shown in FIG. 6(d), the intrinsic permeability of 170 nm-thick LbL layers was 1.48×10$^{-14}$ m$^2$, dropping over two orders of magnitude than pristine membrane. In addition, the presence of GO in LbL layers lowered the permeability about one order of magnitude.

Electrochemical Analysis:

For electrochemical analysis, DME 0.1 M LiClO$_4$ was used as an electrolyte. Before electrochemical analysis, all samples vacuum-dried and stored in Ar-filled glove box for at least 1 week. Ionic conductivity measurements were carried out by impedance spectroscopy with a Solartron SI1260 impedance analyzer by sweeping the frequency from 1 MHz to 1 Hz at 10 mV of ac amplitude. Test membrane with electrolyte placed between two stainless steel electrodes in Swagelok cell. For Li transfer number, dendrite growth and cycling behavior, two-electrode Li cells were assembled in Ar-filled glove box with test membrane and liquid electrolyte. The area of the Li electrode was 0.97 cm$^2$ (1.11 cm in diameter) and two stainless steel rod current collectors were used at both ends of the Swagelok cells to connect the electrode to a galvanostat (Solartron 1470E Cell Test System).

Li transfer number was determined by the combination of dc polarization and ac impedance analysis. The change of current according to the time was monitored at constant potential (10 mV) for 7 days and ac impedance spectra were measured before and after polarization. The transport number is given by the following equation:

$$T_+ = \frac{I_s(\Delta V - I^0 R_1^0)}{I_0(\Delta V - I_S R_1^s)} \quad (2)$$

where $I_s$ and $I_0$ are the steady-state and the initial current determined by the dc polarization, respectively; $\Delta V$ is the dc potential applied across the cell (10 mV); $R_1^o$ and $R_1^s$ are the interfacial resistance measured by the ac impedance analyzer before and after polarization.

Constant-current charging of the cells was conducted at current density of 0.2 mA/cm$^2$ to observe Li dendrite growth. The time evolution of voltage (chronopotentiogram) between two Li electrodes was recorded and the short-circuit time ($t_{sc}$) was defined as the time when a rapid drop of the cell voltage was observed. Charge-discharge cycling also was carried out by passing a constant current density (0.2 mA/cm$^2$) and reversing its polarity every 4 hours ("h").

Figure 7:
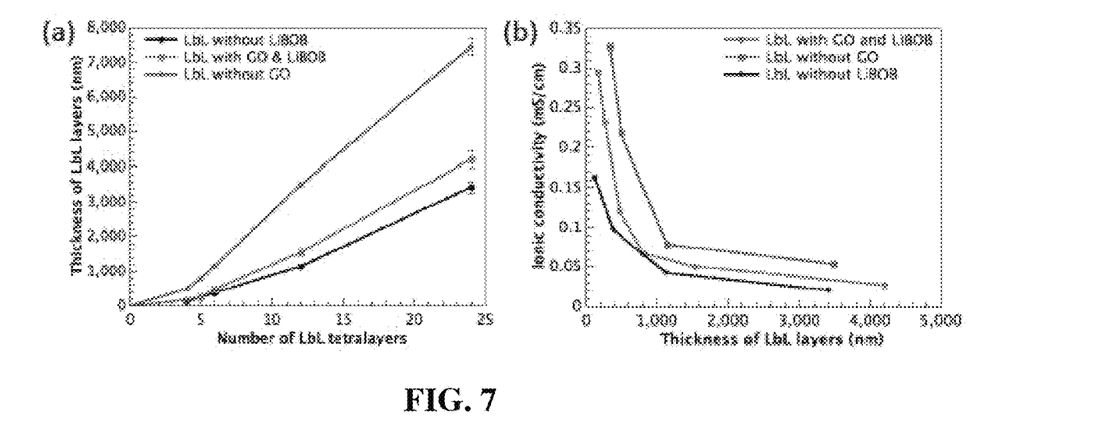
FIGS. 7(a) and 7(b) show comparisons of thickness and ionic conductivities of LbL modified membranes under three circumstances: LbL with GO and without LiBOB in polymer solution (black), LbL with GO and LiBOB in polymer solution (red), and LbL without GO and with LiBOB in polymer solution (blue).

Ionic Conductivities of LbL-Modified Membrane:

As shown in FIG. 6(b), ionic conductivities of LbL-modified membrane were changed with thickness increase of LbL layers. DME with 0.1 M LiClO$_4$ was used as electrolyte. The ionic conductivity (0.29 mS/cm) of the membrane with 170 nm-thick tetralayers (4 tetralayers, total thickness of the membrane: 25.17 μm) was greatly improved than that of pristine membrane (0.13 mS/cm, thickness of pristine membrane: 25 μm). It means PEO/GO/PEO/PAA multilayer is highly conductive even though GO is incorporated as a barrier layer. It is thought that relatively big size of bis(oxalate)borate anion gaped between polymer chains so that make easily the transport of ions. FIG. 7(b) clearly shows the effect of GO and LiBOB on ionic conductivities of LbL-modified membranes. The incorporation of GO decreases the ionic conductivity of membranes, but the dissolution of LiBOB in polymer solutions promotes it at all thickness range to compensate the blocking effect of GO. However, ionic conductivities went down with increase of thickness by difficulty of traversing thick films.

Figure 8:
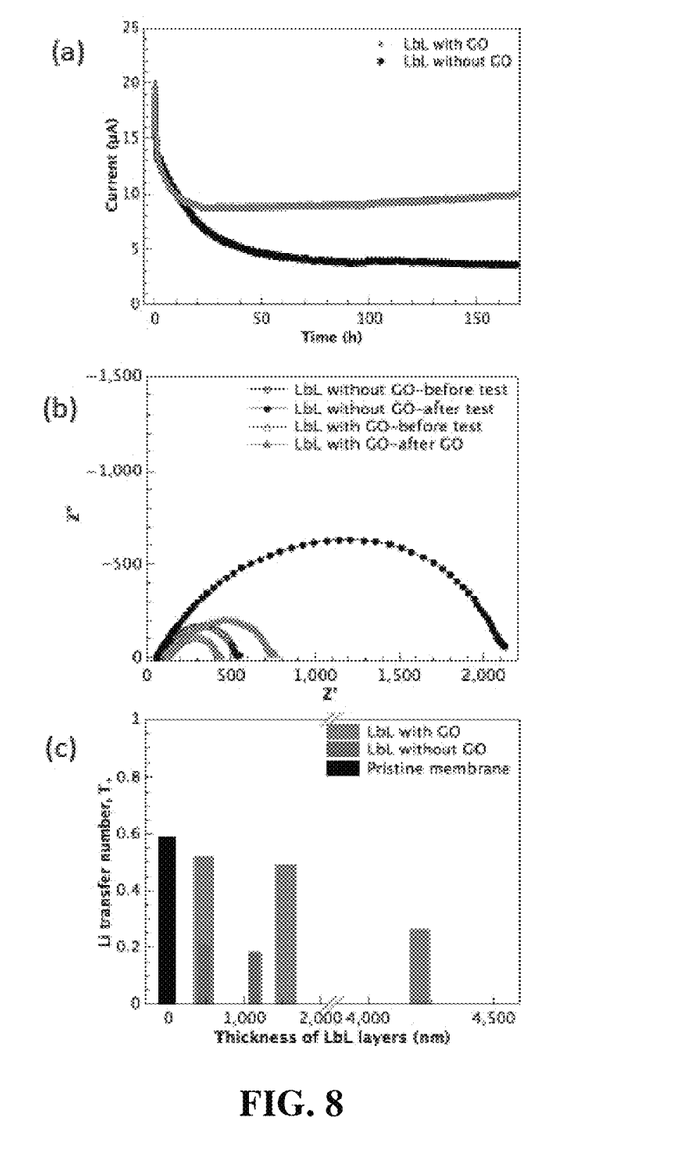
FIG. 8(a) shows chronoamperogram of 12-tetralayer LbL-assembled membranes with and without incorporation of GO at a constant potential of 10 mV.
FIG. 8(b) shows a comparison of impedance spectra before and after tests for Li transfer number.
FIG. 8(c) shows the effect of the LbL layer thickness and presence of GO on Li transfer number of LbL assembled membranes.

Li Transfer Numbers of LbL-Modified Membrane:

Li transfer number was explored to understand the true transport property of Li ions in LbL-modified membranes. It is determined by the combination of dc polarization and ac impedance. As shown in FIG. 8(a), when a small and constant potential is applied to the cell sandwiching a membrane and electrolyte between two Li electrodes, initial current decreases until steady-state value is reached. The anion current is disappeared by concentration gradient across the cell in steady-state current. Li transfer number is given by dividing steady-state current by the initial current. LbL modified membrane with GO got the higher steady-state current than the membrane with mere polymer LbL layers, while they had almost the same initial current. However, during polarization, passivation layer also grows on the electrodes to inflict an increase of interfacial resistance.

FIG. 8(b) presents the change of interfacial resistance before and after polarization. The ac impedance spectra of the GO-incorporated membrane intersected higher Z' that means larger bulk resistance than that of the membrane without GO before applying potential across the cell. The membrane having LbL layers with GO, however, exhibited smaller interfacial resistance than the membrane without GO. The difference of interfacial resistance became much bigger after polarization. The diameter of hemisphere for the membrane without incorporation of GO grew 4 times than before, while twofold increase of hemisphere size was observed in the cell using the LbL-modified membrane with GO. Li transfer number can be corrected by subtracting additional voltage drop by passivating layers from the applied potential (equation (2)).

FIG. 8(c) compares the Li transfer numbers of LbL-modified membranes and pristine membrane. LbL-assembled membrane with GO shows a little bit smaller $T_+$ than pristine membrane (0.59) and their $T_+$ decrease with increase of LbL thickness. But, the values are much higher than $T_+$ of LbL-modified membrane without GO. The $T_+$ of membrane with GO was 0.52, while the membrane without GO had 0.21 at the same thickness of LbL layers (470 nm). GO is helpful for Li ion transport through the membrane.

Figure 9:
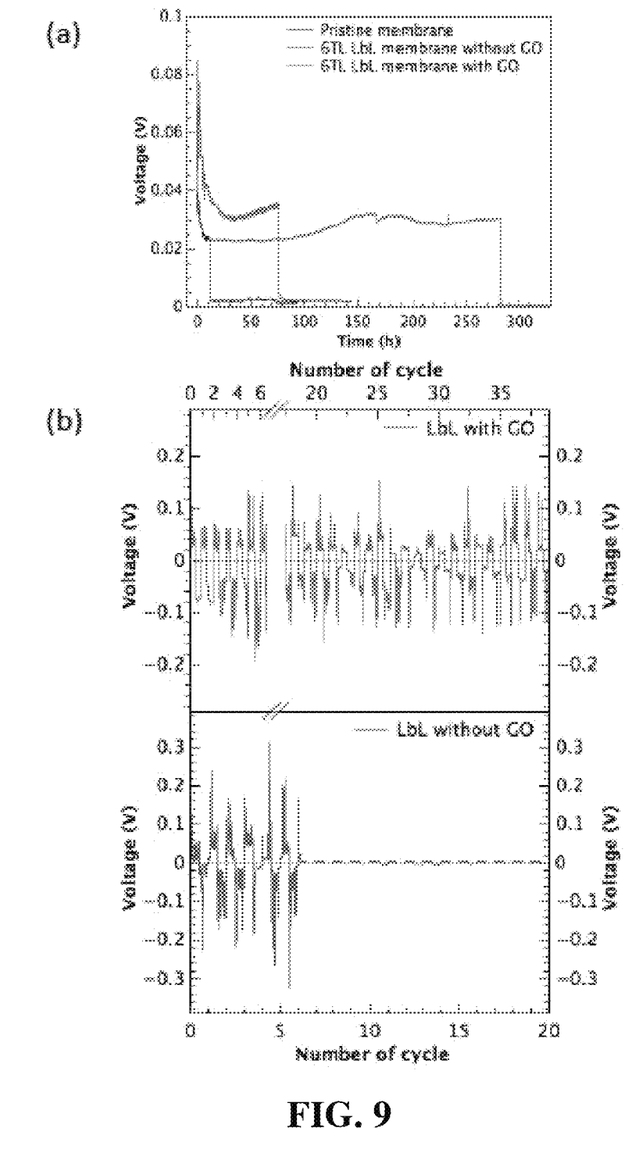
FIG. 9(a) shows chronopotentiogram of pristine and LbL-assembled membranes bearing GO or not at a constant current density of 0.2 $mA/cm^2$.
FIG. 9(b) shows cyclability test of LbL-assembled membrane with or without GO at constant current density varying its polarity every 4 hours.
Figure 10:
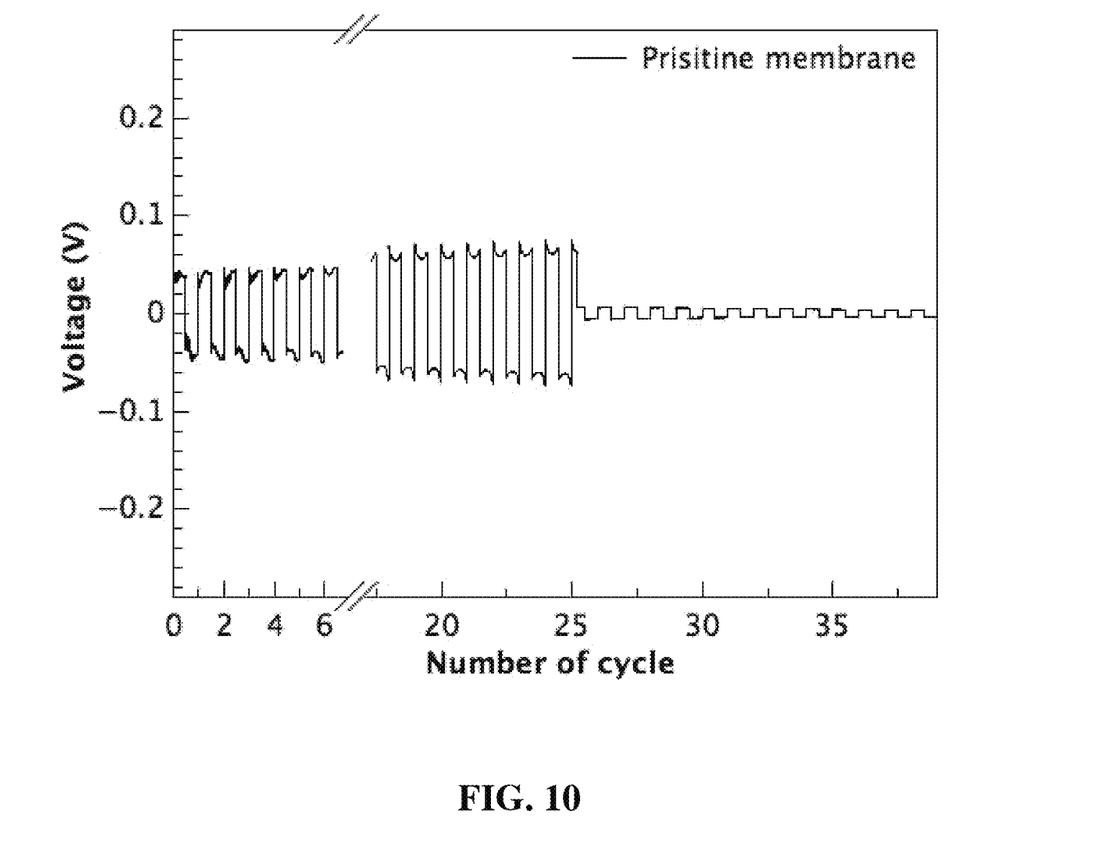
FIG. 10 shows cyclability test of pristine membrane at 0.2 $mA/cm^2$ of constant current density varying its polarity every 4 hours.
Figure 11:
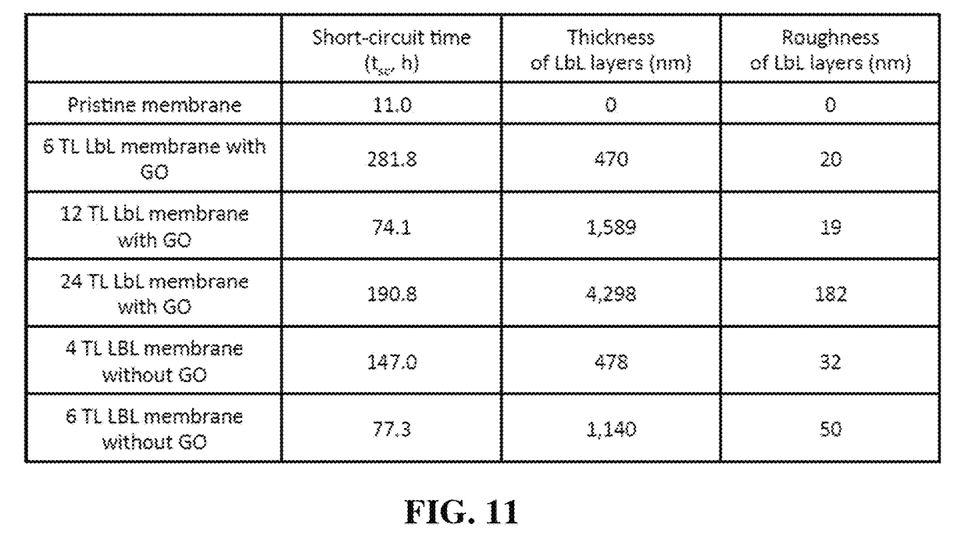
FIG. 11 is a table that shows a comparison of short-circuit time of test cells, thickness and roughness for pristine and LbL-assembled membranes with and without GO.

Dendrite Growth of LbL-Modified Membrane:

Dendrite growth on Li anode surface and cyclability are also examined. While 0.2 mA/cm$^2$ of current density was applied on two Li electrode cells, voltage change was monitored as a function of time. For cyclability test, the polarity of current density is reversed every 4 h. As shown in FIG. 9(a), sudden voltage drop means short circuit due to the dendrite growth on Li anode and punching out the membrane. While pristine membrane endured just 11 h, LbL-modified membrane with 6 tetralayers stood 281.8 h. FIG. 11 is a table that shows the short-circuit time of two Li electrode cell with pristine and LbL-modified membrane with GO or without GO. LbL modification of pristine membrane with GO effectively suppressed the dendritic growth on Li anode. That is also found in cycling test. As shown FIG. 9(b) and FIG. 10, LbL modified membrane with GO stood over 40 cycles, while LbL-modified membrane without GO stood only 6 cycles and pristine membrane endured 25 cycles.

Other embodiments are within the scope of the following claims.

What is claimed is:

1. A method of preparing a multi-layer structure on a substrate comprising:
   forming a pair of bilayers on a surface of the substrate in a layer-by-layer assembly by contacting the substrate with a solution with sequential adsorption of materials in each layer,
   the first bilayer including a first material and a second material, the first and second material having complementary functional groups;
   the second bilayer including a third material and a fourth material, the third and fourth material having complementary functional groups; and
   the pair of bilayers includes an ion-conductive polymer layer, a polyanion or polycation, and a graphene oxide barrier layer substantially free of graphene.

2. The method of claim 1, wherein the substrate includes a membrane and preparing the multi-layer structure further comprises:
   contacting the membrane with a first solution containing the first material;
   contacting the membrane having the first material with a second solution containing the second material;
   contacting the membrane having the first and second material with a third solution containing the third material; and
   contacting the membrane having the first, second and third material with a fourth solution containing the fourth material.

3. The method of claim 2, wherein pH of the first solution, the second solution, the third solution, and the fourth solution is adjusted for hydrogen bonding between materials in the bilayers.

4. The method of claim 2, wherein lithium bis(oxalate) borate is dissolved in the first solution.

5. The method of claim 2, wherein lithium bis(oxalate) borate is dissolved in the second solution.

6. The method of claim 2, wherein lithium bis(oxalate) borate is dissolved in the third solution.

7. The method of claim 2, wherein lithium bis(oxalate) borate is dissolved in the fourth solution.

8. The method of claim 2, wherein the first solution includes polyethylene oxide, graphene oxide, or polyacrylic acid.

9. The method of claim 2, wherein the second solution includes polyethylene oxide, graphene oxide, or polyacrylic acid.

10. The method of claim 2, wherein the third solution includes polyethylene oxide, graphene oxide, or polyacrylic acid.

11. The method of claim 2, wherein the fourth solution includes polyethylene oxide, graphene oxide, or polyacrylic acid.

12. The method of claim 1, wherein the first material and the third material are the same.

13. The method of claim 1, wherein the first material and the third material are different.

14. The method of claim 1, wherein the second material and the fourth material are the same.

15. The method of claim 1, wherein the second material and the fourth material are different.

16. The method of claim 1, wherein the substrate includes a membrane.

17. The method of claim 16, wherein the membrane includes polypropylene.

18. The method of claim 1, wherein the substrate is plasma treated.

19. The method of claim 1, wherein the substrate is glass.

20. The method of claim 1, wherein the first material is polyethylene oxide, the second material is graphene oxide, the third material is polyethylene oxide, and the fourth material is polyacrylic acid.

21. The method of claim 20, wherein the pair of bilayers is formed on a polypropylene membrane.

* * * * *